W. J. ROCHE.
TRACTION OR NON-SKID CHAIN RETAINING MEANS.
APPLICATION FILED OCT. 26, 1917.
1,285,395.
Patented Nov. 19, 1918.
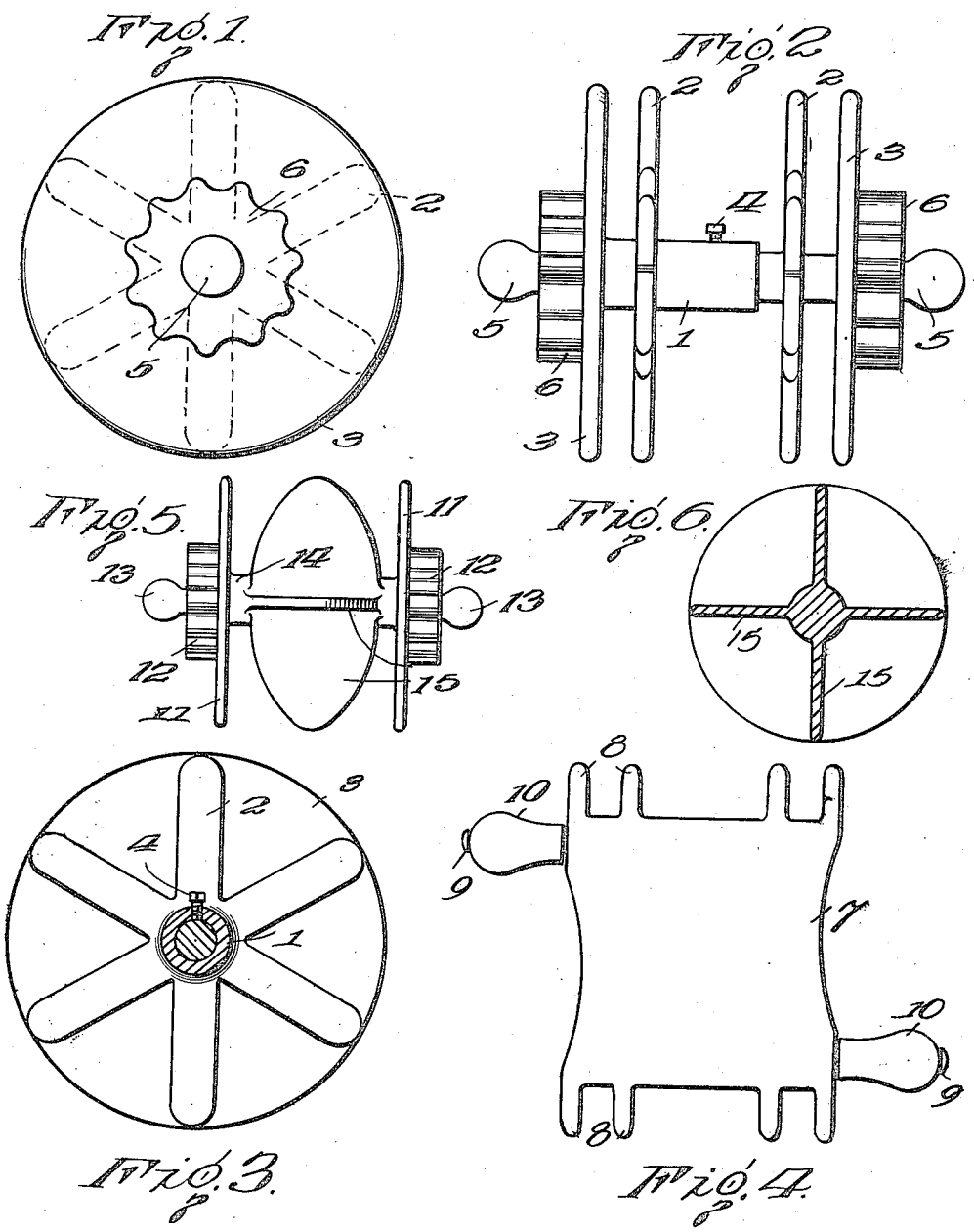
W. J. Roche
Inventor
By Geo. P. Kimmel
Attorney

UNITED STATES PATENT OFFICE.

WILLIAM J. ROCHE, OF COCHRANTON, PENNSYLVANIA.

TRACTION OR NON-SKID CHAIN RETAINING MEANS.

1,285,395.

Specification of Letters Patent.

Patented Nov. 19, 1918.

Application filed October 26, 1917. Serial No. 198,704.

*To all whom it may concern:*

Be it known that I, WILLIAM J. ROCHE, a citizen of the United States, residing at Cochranton, in the county of Crawford and State of Pennsylvania, have invented certain new and useful Improvements in Traction or Non-Skid Chain Retaining Means, of which the following is a specification.

This invention relates to motor vehicle accessories and the invention has more especial reference to an improved traction or non-skid chain retaining means.

The invention has for its dominant object to provide a device for retaining traction or non-skid chains thereon in a manner to prevent tangling of the same, thus, allowing them to be readily arranged over the tread portions of pneumatic tires commonly used on motor driven vehicles in but a short period of time.

Another and equally important object of the invention is to provide a portable device of the character mentioned upon which a traction chain may be quickly and effectually arranged and then placed in a suitable receptacle for further use.

Other independent objects are to provide features of construction of portions of the device which tend toward the attainment of the above aims irrespective of the relation in which they are used.

Other objects will be in part obvious and in part pointed out hereinafter.

The invention accordingly consists in the features of construction, combination of elements and arrangement of parts which will be exemplified in the construction hereinafter set forth, and the scope of the application of which will be indicated in the following claims.

In the accompanying drawings, wherein is shown several of various possible embodiments of my invention:—

Figure 1 is an end elevation of my improved chain retaining means,

Fig. 2 is a side elevation thereof,

Fig. 3 is a transverse section taken on the line 3—3 of Fig. 2,

Fig. 4 is a slightly modified form of my device,

Fig. 5 is a still further modified form of the device, and,

Fig. 6 is a transverse section therethrough.

Similar reference characters refer to similar parts throughout the several views of the drawings.

Certain features and aims of this invention will be more readily understood if the following facts be borne in mind:—

Traction or non-skid chains commonly used upon pneumatic tires at the present day are usually placed in a fabric or similar bag when not in use or are filed or thrown carelessly under the seat of the vehicle or in other convenient places, thus, causing the same to become tangled and as a consequence, consume considerable time as well as inconvenience the operator of the vehicle when it becomes necessary to again apply the same over the tread portions of the tires of the vehicle. The above disadvantages is eliminated by the use of my improved chain retaining device and is, among other advantageous features, attained in the constructions of the nature of those hereinafter described.

Having more particular reference to the drawings, the improved device includes a telescopic body or core 1 having toothed or star wheels 2 fixedly mounted upon the opposite extremities thereof while disks 3 are also mounted on the said extremities and are arranged in spaced relation to the star wheels 2, it being noted in this connection, that the star wheels are arranged in proximity to the inner sides of the disks 3. A set screw 4 is turned into engagement with one section of the body 1 and as will be appreciated, serves as means for engaging the remaining section and thus, securing the telescopic body in an adjusted position.

Coaxially disposed handles 5 are secured to the disks 3 and carry hand wheels 6 having irregular peripheries, whereby firm engagement with the same will be facilitated.

In the Fig. 4, I have shown a slightly modified form of traction chain receiving device, the same in this particular embodiment including a substantially rectangularly shaped piece of material 7 having spaced pairs of fingers generally indicated by the numeral 8 formed upon the opposite ends thereof, while shafts 9 are arranged upon the opposite sides of the strip 7 in proximity to the several ends of the same. Handles 10 are loosely mounted on the shafts 9 and, obviously, serve as means for facilitating rotation of the strip 7, whereby traction chains may be arranged thereon.

Another modified form of the device is shown in the Figs. 5 and 6 and includes circular end pieces 11 having wheels 12 secured to their outer faces, which wheels correspond to the hand wheels 6, while coaxial handles 13 are secured to the said hand wheels. The oppositely disposed circular pieces 11 are connected by a core 14 having a plurality of radially disposed curved blades 15 formed integral or otherwise secured thereto and, obviously, extending from the same. In this connection, it is to be noted that the blades 15 are so arranged as to provide separate and distinct compartments for the transversely disposed chains of non-skid devices such as herein mentioned. By so arranging the transverse chains, tangling of the same when the non-skid device has been rolled upon the reel will be positively prevented and as a consequence, the same may be readily unreeled therefrom for application over the tread of a vehicle wheel.

In operation the parallelly arranged longitudinal chains of the non-skid device have their adjacent ends engaged over certain of the fingers of the star wheels 2, whereupon the device is rotated by grasping each of the hand wheels 6 and revolving the same. In this way, the longitudinal chains of the device will be received about the several star wheels 2 of the reel and as a consequence, the intermediate or transversely disposed chains will be properly arranged and tangling of the same positively prevented. By holding the reel up with both hands during operation, the same may be kept out of mud. The coaxial handles 5 secured to the several disks 3 serve as means for permitting the reel to be rotatably supported when playing out the traction or non-skid chains in position to be arranged over the tread portions of tires; the same, as will be appreciated, being held loosely in the hands of the operator to permit free rotation of the device. Operation of the modified form shown in the Figs. 5 and 6 is effected in a similar manner, the transversely disposed chains of the non-skid device being received between the radially disposed blades 15.

Operation of the modified form shown in Fig. 4 is effected by grasping the loosely mounted handles 10 and revolving the strip 7, thus, causing the longitudinal chains of the non-skid device to be arranged between the spaced pairs of fingers 8. To remove the non-skid chains from the device, it is of course rotated in a reverse or counter direction.

Manifestly, the construction shown is capable of considerable modification and such modification as is within the scope of my claims, I consider within the spirit of my invention.

I claim:—

1. A device of the character described, including a body, toothed wheels mounted on said body in proximity to the opposite ends thereof, and end pieces also mounted on said body in spaced relation to said toothed wheels.

2. A device of the character described, including an adjustable body, star wheels mounted on said body in proximity to the ends thereof, and circular end pieces also mounted on said body in spaced relation to said star wheels.

3. A device of the character described, including a body, star wheels mounted on said body in proximity to the opposite ends thereof, guards mounted on the body in spaced relation to said star wheels, and coaxially disposed engaging means arranged on said guards.

4. A device of the character described, including a telescopic body, toothed wheels mounted on said body in proximity to the opposite ends thereof, disks also mounted on the body in spaced relation to said toothed wheels, hand wheels secured to the outer faces of said disks, and coaxial handles arranged on the hand wheels.

5. A device of the character described, including a rotatable body, means arranged on said body for maintaining the side and intermediate elements of traction chains in spaced relation, and handles secured to the body.

6. A device of the character described, including a rotatable body, means arranged on said body for maintaining the side and intermediate elements of traction chains in spaced relation, and handles arranged on the opposite ends of said body.

In testimony whereof I affix my signature hereto.

WILLIAM J. ROCHE.